United States Patent
Dai et al.

(10) Patent No.: US 7,900,497 B2
(45) Date of Patent: Mar. 8, 2011

(54) SYSTEM, METHOD AND APPARATUS FOR OBTAINING TRUE ROUGHNESS OF GRANULAR MEDIA

(75) Inventors: Qing Dai, San Jose, CA (US); Bruno Marchon, Palo Alto, CA (US); Tsai-Wei Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 536 days.

(21) Appl. No.: 11/950,021

(22) Filed: Dec. 4, 2007

(65) Prior Publication Data

US 2009/0139314 A1 Jun. 4, 2009

(51) Int. Cl.
*G01B 21/30* (2006.01)
(52) U.S. Cl. ............................................ 73/1.89; 73/105
(58) Field of Classification Search ................. 73/1.89
See application file for complete search history.

(56) References Cited

U.S. PATENT DOCUMENTS

| | | | |
|---|---|---|---|
| 4,043,187 A | | 8/1977 | Tomomatsu |
| 5,230,990 A | * | 7/1993 | Iwasaki et al. ............... 430/321 |
| 5,610,326 A | | 3/1997 | Leost |
| 5,922,238 A | * | 7/1999 | Savant et al. .................... 252/1 |
| 6,033,759 A | | 3/2000 | Seki |
| 6,138,502 A | * | 10/2000 | Burga et al. .................. 73/105 |
| 2005/0181239 A1 | | 8/2005 | Ma et al. |
| 2006/0038307 A1 | * | 2/2006 | Sasai ............................ 264/2.5 |
| 2006/0239154 A1 | | 10/2006 | Shirasuna et al. |

FOREIGN PATENT DOCUMENTS

| | | | |
|---|---|---|---|
| EP | 1700680 A | * | 9/2006 |
| GB | 2390684 A | | 1/2004 |
| JP | 59079832 | | 5/1984 |
| JP | 62066138 | | 3/1987 |
| JP | 63148141 | | 6/1988 |
| JP | 2170010 | | 6/1990 |
| JP | 2222157 | | 9/1990 |
| JP | 4099909 | | 3/1992 |
| JP | 4131738 | | 5/1992 |
| JP | 4249701 | | 9/1992 |
| JP | 5306924 | | 11/1993 |

OTHER PUBLICATIONS

S.V. Gaponov et al., "AFM Investigations of the Nanoscale Roughness of Polymer Replicas on Glass Substrates," SPM-2202, Proceedings, pp. 104-142, 2007 download.

A.P. Young et al., "Replica Method for Examining Surface Profiles," The Review of Scientific Instruments, vol. 30, No. 6, Jun. 1959, pp. 444-446.

J.P. Butin, "Ndt by the Replica Method," IPC Business Press, Ltd., Non-Destructive Testing, vol. 3, No. 3, Jun. 1970, pp. 173-176.

* cited by examiner

*Primary Examiner* — Daniel S Larkin

(57) ABSTRACT

The true roughness of highly granular perpendicular media is measured by forming an inverse replica of the surface of the media. The invention enables AFM measurements of granular media valley depth to more consistently predict the corrosion performance of the media. A liquid resist is used to first replicate the media topography and form the inverse replica. The narrow valleys in the original media are precisely modeled as sharp peaks on the replica. The height of the peaks are readily measured with an AFM tip. The resulting image is a negative of the original surface.

8 Claims, 2 Drawing Sheets

SYSTEM, METHOD AND APPARATUS FOR OBTAINING TRUE ROUGHNESS OF GRANULAR MEDIA

BACKGROUND OF THE INVENTION

1. Technical Field

The present invention relates in general to magnetic media surface finish and, in particular, to an improved system, method, and apparatus for measuring the true roughness of highly granular perpendicular media.

2. Description of the Related Art

Understanding and controlling the surface finish (i.e., "roughness") of magnetic media is a significant parameter in the manufacture of hard disk drives. Roughness affects corrosion and the overall hard disk drive performance. Perpendicular media performance is particularly sensitive to roughness since these structures are highly granular and, thus, difficult to cover with overcoats.

It has been demonstrated that atomic force microscopy (AFM) may be used to measure roughness. AFM is particularly well suited to measure the highest elevations or "peaks" (i.e., Rp) of perpendicular media at an order of magnitude of about 10 nm at a lateral scale of about 1 μm. Again, such measurements are an important indicator of corrosion performance for production media.

As more exotic oxides are used as segregants in perpendicular media, it has been found that although Rp may remain the same, the depths of the lowest elevations, or the "valleys" between the peaks, are becoming more difficult to measure. In addition, the widths or gaps between the valleys also are becoming narrower (i.e., orders of magnitude smaller; e.g., nm instead of μm) such that measurement tools are unable to probe such topography.

Thus, there are no reliable means to obtain this information since the valley gaps are much narrower than the tips of the AFM instruments, which have a minimum radius that is much larger than the size of the features being measured. This problem is further exacerbated as the grain size continues to be reduced as novel oxides are employed. For example, most AFM measurements are simply truncated when they are physically unable to perform precise measurements. As a result, the corrosion-related failures of some novel media cannot be predicted. Thus, an improved solution for measuring the true roughness of highly granular perpendicular media would be desirable.

SUMMARY OF THE INVENTION

Embodiments of a system, method, and apparatus for measuring the true roughness of highly granular perpendicular media are disclosed. The invention enables AFM measurements of granular media valley depth with far greater accuracy than previously possible. With this method, a more consistent prediction of the corrosion performance of a media may be predicted based on the true peak-to-valley depth value.

Rather than image the magnetic media directly with a relatively blunt AFM tip, a liquid resist is used to first replicate the media topography and form an inverse replica. Following this procedure, the narrow valleys in the original media are precisely modeled as sharp peaks on the replica. The height of the peaks is readily measured with an AFM tip without the complication associated with using blunt tips to measure media valleys. The resulting image is a negative of the original surface.

The inverse replica is measured instead of directly imaging the disk surface itself. For example, in one embodiment the replica of the surface of the disk may be formed by placing the disk on a flat surface, with the side of interest facing up. A drop of acrylic-based liquid photo resist is placed on the disk surface and allowed to spread over the surface. A UV-transparent plastic substrate is placed down on the disk surface to cover the resist-wetted area, and then UV cured for about one minute. Next, the newly-formed plastic substrate is separated from the disk surface and heated to complete the curing of the inverse replica. After the replica is formed it is AFM imaged. The peak heights of the replica precisely replicate the valley depths of the original disk.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
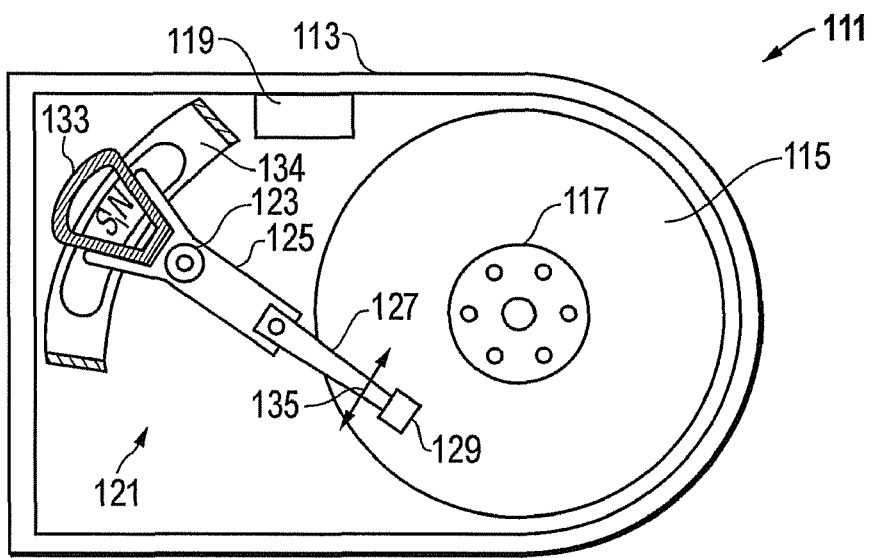
FIG. 1 is a schematic diagram of one embodiment of a disk drive constructed in accordance with the invention.

Referring to FIG. 1, a schematic drawing of one embodiment of an information storage system comprising a magnetic hard disk file or drive 111 for a computer system is shown and is constructed in accordance with the invention. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of the comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one (e.g., eight shown in FIG. 2) cantilevered load beam and suspension 127, and is assembled as described above. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

Figure 2:
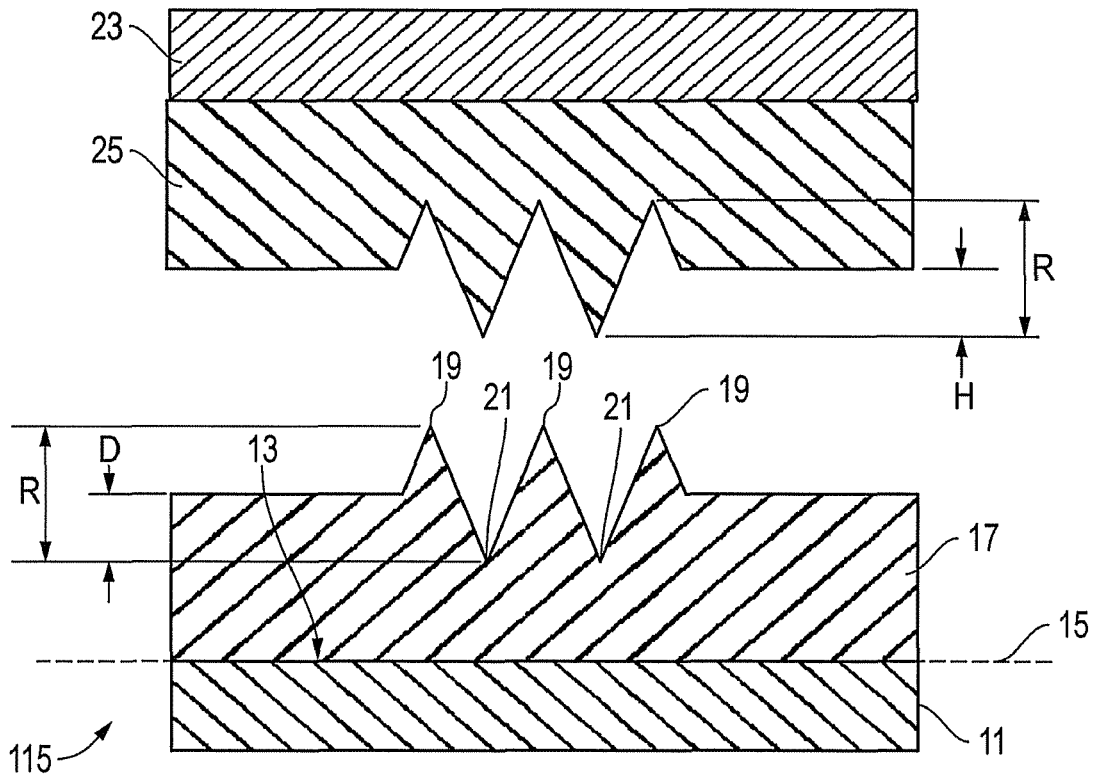
FIG. 2 is a schematic, magnified sectional side view of one embodiment of a media disk and replica constructed in accordance with the invention.

Referring now to FIG. 2, one embodiment of the disk 115 comprises a substrate 11 having a surface 13 that defines a plane 15. A magnetic media 17 (e.g., perpendicular media) is formed on the surface 13. The magnetic media 17 has a surface finish comprising a plurality of peaks 19 and valleys 21 located between the peaks 19. The valleys 21 have a depth D measured in a direction perpendicular to the plane 15 that, in some embodiments, is shallower than 10 nm. In other embodiments, the depth D of the valleys 21 is shallower than about 3 nm and, in still other embodiments, shallower than about 1 nm. In still other embodiments, the overall peak-to-valley measurement or "roughness" R is no more than 5.5 nm and, in other embodiments, no more than 5 nm. The disks 115 also may be provided with an overcoat having a thickness of about 4 nm.

Figure 3:
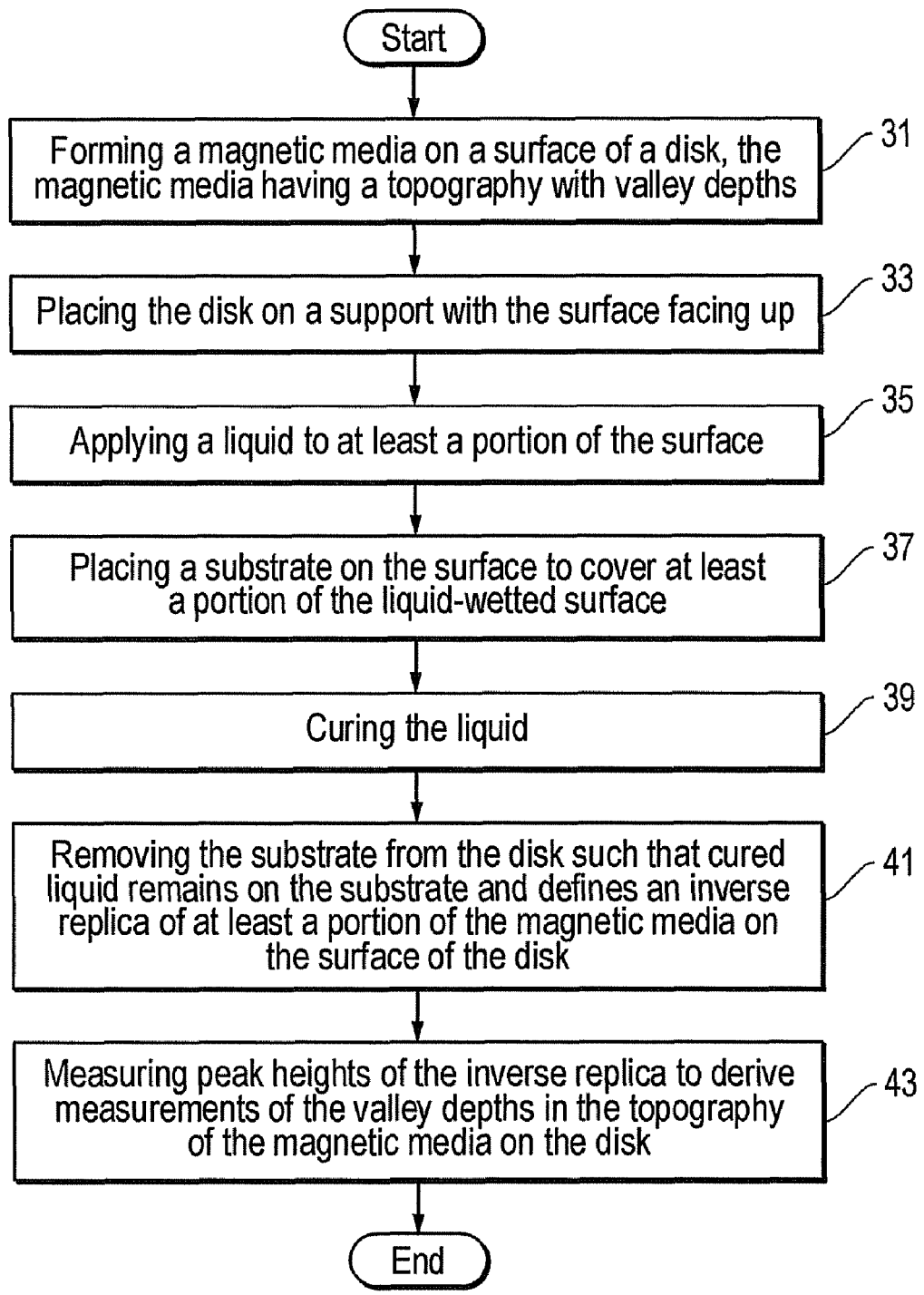
FIG. 3 is a high level flow diagram of one embodiment of a method in accordance with the invention.

Referring now to FIG. 3, a high level flow diagram of one embodiment of a method of measuring a surface finish of a magnetic media is disclosed. The method begins as indicated and comprises forming a magnetic media (e.g., perpendicular media) on a surface of a disk, the magnetic media having a topography with valley depths (step 31); placing the disk on a support with the surface facing up (step 33); applying a liquid to at least a portion of the surface (step 35); placing a substrate on the surface to cover at least a portion of the liquid-wetted surface (step 37); curing the liquid (step 39); removing the substrate from the disk such that cured liquid remains on the substrate and defines an inverse replica (see, e.g., FIG. 2 illustrating substrate 23 and inverse replica 25) of at least a portion of the magnetic media on the surface of the disk (step 41); measuring peak heights of the inverse replica (see, e.g., FIG. 2 illustrating height H) to derive measurements of the valley depths D (FIG. 2) in the topography of the magnetic media on the disk (step 43); before ending as indicated. As shown in FIG. 2, the overall peak-to-valley measurement or roughness R of the inverse replica 25 may be no more than 5.5 nm, as described above for the disk 115 itself.

In other embodiments (e.g., after step 41), the method may further comprise heating the substrate at about 75° C. for about 5 minutes to complete the curing of the inverse replica. Steps 35 and/or 37 may further comprise spreading the liquid (e.g., an acrylic-based liquid photo resist) over said at least a portion of the surface. The substrate may comprise a UV-transparent plastic substrate, and step 39 may comprises UV curing the liquid through the UV-transparent plastic substrate for about one minute.

In another embodiment, step 43 may comprise using AFM to measure a topography of the inverse replica instead of directly imaging the topography of the magnetic media on the surface of the disk. The method also may further comprise predicting a corrosion performance of the magnetic media based on the derived measurements of the valley depths in the topography of the magnetic media on the disk. In addition, the topography of the magnetic media may have features on the order of less than 10 nm in lateral dimension, and the topography of the magnetic media may comprise peaks and valleys having widths therebetween of about 2 to 5 nm.

In still another embodiment, the method comprises a method of measuring a surface finish of a perpendicular magnetic media, comprising: forming the perpendicular magnetic media on a surface of a disk, the perpendicular magnetic media having a topography with peaks and valleys; placing the disk on a flat support with the surface facing up; applying a liquid comprising an acrylic-based liquid photo resist to an area on the surface; placing a substrate that is UV-transparent on the surface to cover the liquid-wetted area of the surface; UV curing the liquid through the UV-transparent substrate; removing the substrate from the surface of the disk such that cured liquid adheres to the substrate and defines an inverse replica of at least a portion of the perpendicular magnetic media on the surface of the disk, the inverse replica having peaks that are inverse to the valleys in the topography of the perpendicular magnetic media; heating the substrate at about 75° C. for about 5 minutes to complete the curing of the inverse replica; and measuring peak heights on the inverse replica to derive valley depths in the perpendicular magnetic media on the disk.

In yet another embodiment, the method may more generally comprise measuring a surface finish of a workpiece, comprising: applying a liquid to a surface of the workpiece, the surface having a topography with valley depths; curing the liquid to form an inverse replica of at least a portion of the topography; removing the inverse replica from the surface of the workpiece; and measuring peak heights of the inverse replica to derive measurements of the valley depths in the topography of the surface.

While the invention has been shown or described in only some of its forms, it should be apparent to those skilled in the art that it is not so limited, but is susceptible to various changes without departing from the scope of the invention.

What is claimed is:

1. A method of measuring a surface finish of a magnetic media, comprising:
    (a) forming a magnetic media on a surface of a disk, the magnetic media having a topography with valley depths;
    (b) placing the disk on a support with the surface facing up;
    (c) applying a liquid to at least a portion of the surface;
    (d) placing a substrate on the surface to cover at least a portion of the surface is wetted by the liquid;
    (e) curing the liquid to form a solid;
    (f) removing the substrate from the disk such that the solid remains on the substrate and defines an inverse replica of at least a portion of the magnetic media on the surface of the disk;
    (g) measuring peak heights of the inverse replica to derive measurements of the valley depths in the topography of the magnetic media on the disk; and
    (h) predicting a corrosion performance of the magnetic media based on the derived measurements of the valley depths in the topography of the magnetic media on the disk.

2. A method according to claim 1, after step (f), further comprising the step of heating the substrate at about 75.degree. C. for about 5 minutes to complete the curing of the inverse replica.

3. A method according to claim 1, wherein step (c) further comprises spreading the liquid over said at least a portion of the surface.

4. A method according to claim 1, wherein the liquid is an acrylic-based liquid photo resist, and the magnetic media is perpendicular media.

5. A method according to claim 1, wherein the substrate is a UV-transparent plastic substrate, and step (e) further comprises UV curing the liquid through the UV-transparent plastic substrate for about one minute.

6. A method according to claim 1, wherein step (g) further comprises using AFM to measure a topography of the inverse replica instead of directly imaging the topography of the magnetic media on the surface of the disk.

7. A method according to claim 1, wherein the topography of the magnetic media has features on the order of less than 10 nm in lateral width.

8. A method according to claim 7, wherein the topography of the magnetic media comprises peaks and valleys having widths therebetween of about 2 to 5 nm, and an overall peak-to-valley measurement is no more than 5.5 nm.

* * * * *